United States Patent
Conley

[11] 3,719,658
[45] March 6, 1973

[54] BENZIDINE YELLOW TYPE PIGMENT

[75] Inventor: Joseph W. Conley, Fort Edward, N.Y.

[73] Assignee: Hercules Incorporated, Wilmington, Del.

[22] Filed: March 12, 1969

[21] Appl. No.: 806,724

[52] U.S. Cl.................260/176, 106/23, 106/288 Q, 260/141
[51] Int. Cl.....C09b 35/10, C09b 35/24, C09d 11/16
[58] Field of Search.......................260/176

[56] References Cited

UNITED STATES PATENTS

| | | | |
|---|---|---|---|
| 1,962,511 | 7/1934 | Krzikalla et al. | 260/181 |
| 3,403,200 | 9/1968 | Randall | 260/178 |
| 3,025,287 | 3/1962 | Ribka | 260/176 |
| 3,161,633 | 12/1964 | Lenoir et al. | 260/176 |
| 3,030,354 | 4/1962 | Ribka | 260/176 |

OTHER PUBLICATIONS

Houben-Weyl, Methoden der Organischen Chemie, Vol. 11/1, 1957, pp. 925–931.

*Primary Examiner*—Floyd D. Higel
*Attorney*—Charles L. Board

[57] ABSTRACT

A benzidine yellow type pigment of unusually good lightfastness and superior strength is described. The pigment, which is a compound of the formula

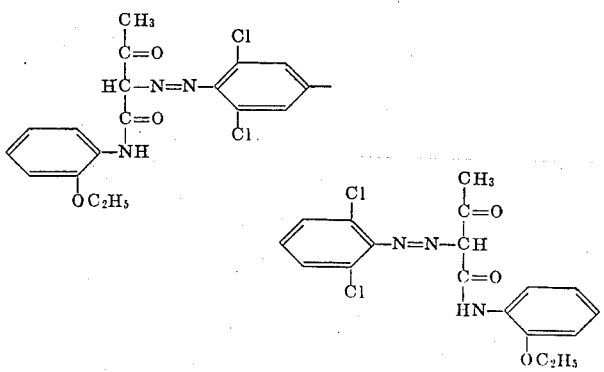

is produced by tetrazotizing 3,3',5,5'-tetrachlorobenzidine and then coupling the tetrazotized product with aceto-acet-o-phenetidide. In a preferred method N,N'-diacetyl-3,3',5,5'-tetrachlorobenzidine is hydrolyzed to the corresponding amine in situ in the acid solution which is to be used for the tetrazotizing step.

1 Claim, No Drawings

BENZIDINE YELLOW TYPE PIGMENT

The present invention relates to a novel water-insoluble disazo dyestuff of the benzidine yellow class which is particularly useful as a pigment and to a process for preparing the same. More particularly, it relates to the compound of the formula

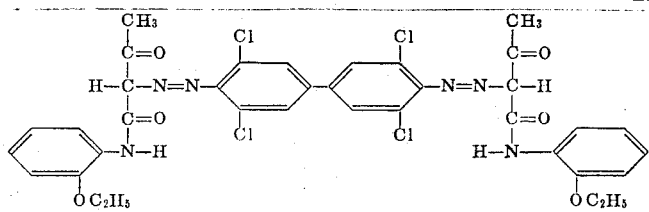

which exhibits unexpected color strength and unusually good light-fastness.

In the Ribka U.S. Pat. No. 3,030,354 there are disclosed disazo dyestuffs of the benzidine yellow class produced by coupling tetrazotized 2,2', 5,5'-tetrachlorobenzidine with the 1-acetoacetylaminobenzenes, the dyestuffs being distinguished by having good lightfastness. Although by and large Ribka's dyestuffs have good color strength and improved lightfastness over the known benzidine yellow dyestuffs, the color strength is merely adequate for many end uses. Therefore, there has been a constant search for new products exhibiting good lightfastness but with highly superior color strength.

Thus, it is the principal object of this invention to provide from available intermediates a new disazo pigment of the benzidine yellow class having the desirable characteristics of masstone transparency and greenish yellow hue, but having excellent lightfastness and high tinctorial strength.

In accordance with this invention it has now been found that the above object is accomplished by using 3,3',5,5'2,2',5,5'-tetrachlorobenzidine of Ribka and coupling it with aceto-acet-o-phenetidide.

The new pigment of this invention is a yellow, water-insoluble dyestuff and can be prepared by tetrazotization of one mole of 3,3',5,5'-tetrachlorobenzidine followed by coupling with 2 moles of aceto-acet-o-phenetidide, preferably under slightly acid conditions. It can also be prepared from the somewhat cheaper diacetyl derivative of 3,3',5,5'-tetrachlorobenzidine by hydrolyzing the derivative to the amine in situ in the acid solution which is subsequently to be used for the tetrazotization step, tetrazotizing and then coupling as above.

The following examples illustrate the preparation of the pigment of the invention using both techniques. Unless otherwise indicated all parts referred to are parts by weight.

EXAMPLE 1

This example illustrates preparing the pigment from 3,3',5,5'-tetrachlorobenzidine, the benzidine being tetrazotized in the following manner. Into a vessel equipped with a high speed stirrer and containing 105.5 parts of sulfuric acid (93.2 percent) was slowly and carefully added with stirring to prevent gassing, 7.8 parts of sodium nitrite (100 percent) followed by 16.1 parts of 3,3',5,5'-tetrachlorobenzidine. The vessel contents were then heated to 50°C. and maintained thereat with stirring for 2 hours to effect clear solution, after which time the solution was downed into 400 parts of crushed ice to lower the temperature to 0°–5° C. and a small quantity of sulfamic acid added to remove excess nitrite.

In a separate vessel a solution prepared by dissolving 22.75 parts of aceto-acet-o-phenetidide in 900 parts of water containing 4.5 parts of sodium hydroxide at 35°–40 C. was added to 140 parts of anhydrous sodium acetate and the resulting solution diluted with water to 3,000 parts at 20°C. The resulting suspension was then adjusted to a pH of 6.0–6.1 with 700 percent acetic acid approximately 9.8 parts being required.

The coupling was effected by adding the above tetrazotized solution over a 30 minute period to the phenetidide suspension with agitation while maintaining the temperature at 20°C., after which time the pH of the resulting color slurry was adjusted to 4.0–4.1 with 5 percent sodium hydroxide solution. When the reaction was complete (as indicated by a negative test with 1-amino-8-naphthol-3,6-disulfonic acid), the color slurry was heated to 95°–97° C. at the rate of 1°C. per minute, held for 15 minutes at this temperature and then drowned to 60°C. and filtered. The pigment filter cake was then washed thoroughly with water and dried at 60°C. The pigment was recovered in the form of a yellow powder.

EXAMPLE 2

This example illustrates the preparation of the pigment of this invention starting with the diacetyl derivative of 3,3',5,5'-tetrachlorobenzidine. To a vessel containing 105.5 parts of 93.2 percent sulfuric acid was added 20.3 parts of N,N'-diacetyl 3,3',5,5'-tetrachlorobenzidine and the vessel contents heated to 130°C. to effect a clear solution. The solution was then cooled to 60°–70°C. and added to a nitrosyl sulfuric acid solution prepared by adding, with agitation, 7.8 parts sodium nitrite (100 percent) slowly and carefully to prevent gassing to 105.5 parts of 93.2 percent sulfuric acid. The resulting solution was maintained at 50°C. for 45 minutes after which time it was drowned into 400 parts of crushed ice to lower the temperature to 0°–5°C. and a small quantity of sulfamic acid added to remove excess nitrite.

Coupling of the above tetrazo-solution with 22.75 parts of aceto-acet-o-phenetidide and isolation of the pigment was carried out in accordance with the procedure of Example 1. The resulting pigment was recovered as a yellow powder.

EXAMPLE 3

The pigment of Example 1 was evaluated for strength and lightfastness on paper drawouts and compared with two known pigments of similar chemical structure, namely, the commercially available pigment (C.I. 21105) made from 3,3'-dichlorobenzidine coupled with aceto-acet-o-anisidide (designated as pigment A) and with a pigment prepared according to the procedure of Example 1 above except that 2,2',5,5'-tetrachlorobenzidine, instead of 3,3',5,5'-tetrachlorobenzidine was coupled with aceto-acet-o-phenetidide (designated as pigment B).

The inks used for these drawouts were prepared by thoroughly mixing 0.3 part of pigment with 1.0 part of lithovarnish and grinding to a smooth masstone ink on a Hoover Muller using 4 cycles with 100 revolutions per cycle, and then reducing the masstone ink with either zinc white paste or aluminum hydrate paste. For strength and hue evaluations, 1 part of the masstone ink was reduced with 50 parts of zinc white paste and the paper drawouts compared visually. For the lightfastness evaluations, 20 parts of the masstone ink were reduced with 80 parts of aluminum hydrate paste and the paper drawouts exposed in a Fadeometer for 450 hours.

The pigment of Example 1 was slightly superior in lightfastness to pigment B and was far superior to pigment A, and was about 3 times stronger than pigment B and slightly less strong than pigment A. The masstone ink of the pigment of this invention was highly transparent, being more transparent than the ink of pigment B and much more transparent than the ink of pigment A. All three pigments had hues of approximately the same order and were relatively greenish yellows.

What I claim and desire to protect by Letters Patent is:

1. The compound having the formula

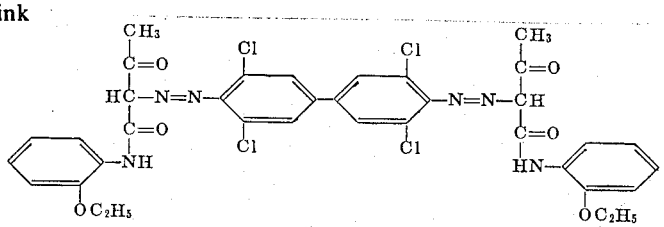

PO-1050
(5/69)

UNITED STATES PATENT OFFICE
CERTIFICATE OF CORRECTION

Patent No. 3,719,658　　　　　　　　Dated March 6, 1973

Inventor(s) Joseph W. Conley (Case 2)

It is certified that error appears in the above-identified patent and that said Letters Patent are hereby corrected as shown below:

Column 1, line 39 of printed patent;
        "3,3',5,5'2,2',5,5'-" should read
      -- 3,3'5,5'-tetrachlorobenzidine instead of the
        2,2',5,5'- --

Column 2, line 21 of printed patent;
        "700" should read --70--

Signed and sealed this 10th day of July 1973.

(SEAL)
Attest:

EDWARD M. FLETCHER, JR.　　　　　Rene Tegtmeyer
Attesting Officer　　　　　　　　Acting Commissioner of Patents